_United States Patent_ [19]

Okano

[11] Patent Number: 4,646,278

[45] Date of Patent: Feb. 24, 1987

[54] PICK-UP POSITIONING APPARATUS FOR DATA PLAYBACK APPARATUS

[75] Inventor: Takashi Okano, Tokorozawa, Japan

[73] Assignee: Pioneer Electronic Corporation, Tokyo, Japan

[21] Appl. No.: 676,430

[22] Filed: Nov. 29, 1984

[30] Foreign Application Priority Data

Nov. 30, 1983 [JP] Japan ............................ 58-184802[U]

[51] Int. Cl.[4] ........................ G11B 21/08; G11B 21/10
[52] U.S. Cl. ........................................ 369/32; 369/41; 369/43; 369/44; 360/78
[58] Field of Search ................. 369/32, 33, 41, 43–46; 360/78, 73, 77; 365/234

[56] References Cited

U.S. PATENT DOCUMENTS 4,236,232 11/1980 Jansen et al. ........................... 369/33
4,301,526 11/1981 Morii et al. ............................ 369/41

FOREIGN PATENT DOCUMENTS 0089020 9/1983 European Pat. Off. ............... 369/32
55-105855 8/1980 Japan ..................................... 369/33
59-175082 10/1984 Japan ..................................... 369/32

Primary Examiner—Raymond F. Cardillo
Assistant Examiner—Steven R. Garland
Attorney, Agent, or Firm—Schwartz, Jeffery, Schwaab, Mack, Blumenthal & Evans

[57] ABSTRACT

A pick-up positioning apparatus for a recording disc playback apparatus such as a video disc player, comprising a control circuit, a memory circuit, a scanning mechanism for moving the pick-up of the playback apparatus along a radius of a recording disc mounted on the playback apparatus, and pick-up sensing circuit for producing signals to indicate the current pick-up position along that radial direction. When a disc is first set on the playback apparatus, the scanning mechanism moves the pick-up along the radial direction to thereby successively read out a number of addresses recorded on the disc, which are stored in the memory circuit together with corresponding position data. Subsequently, to search for a specified address position on the disc, the address stored in the memory circuit which is closest to the specified address is read out and the corresponding stored position data is used in moving the pick-up close to the specified address position.

10 Claims, 28 Drawing Figures

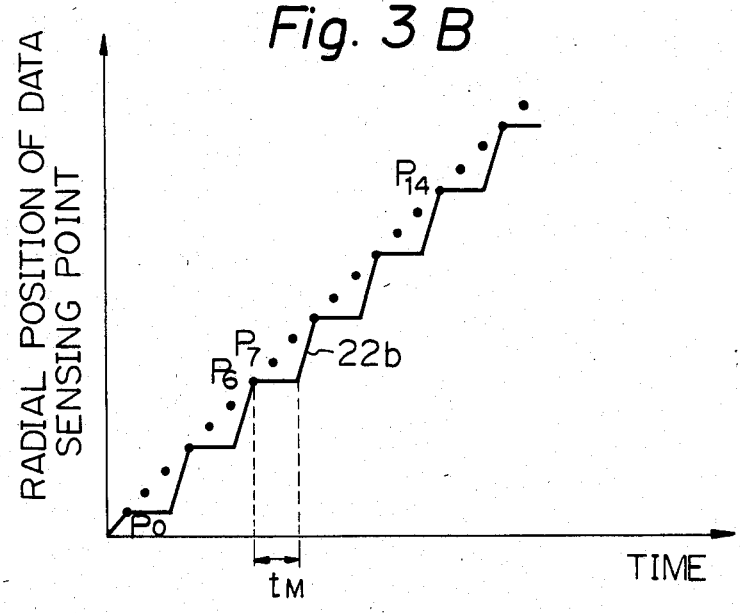
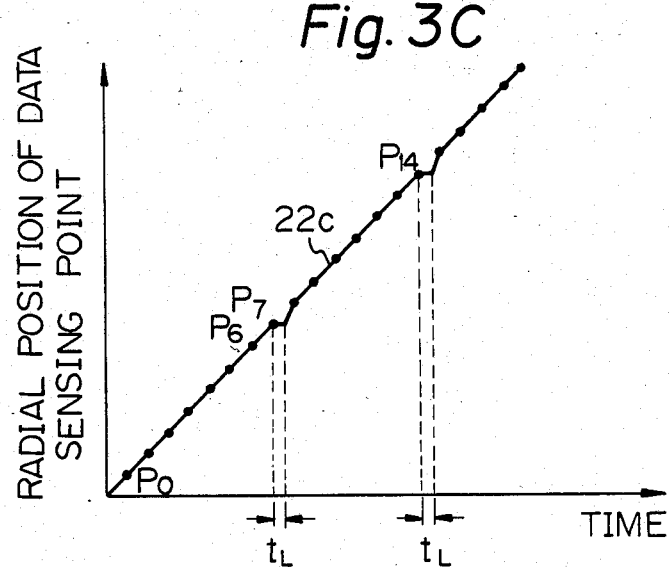

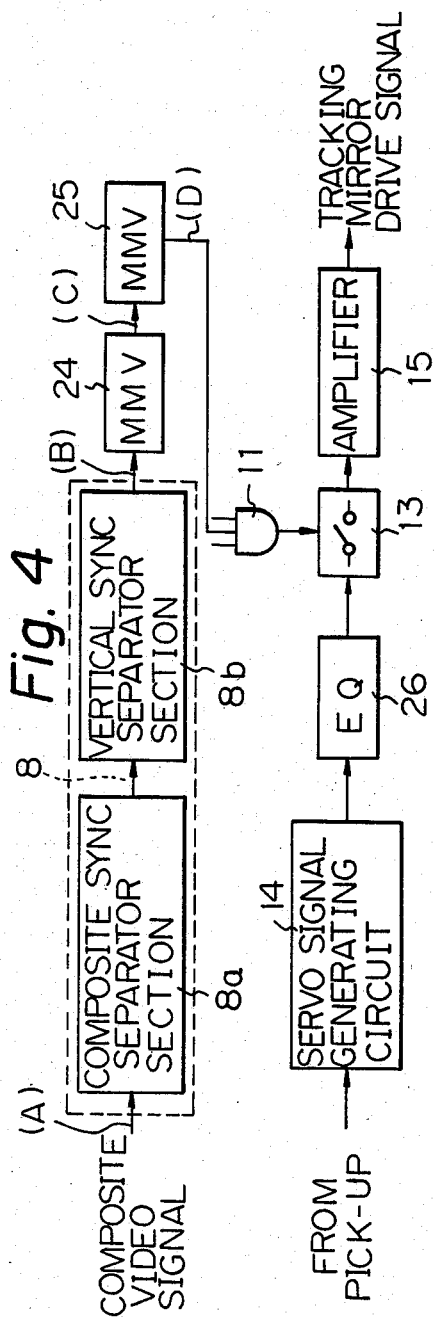
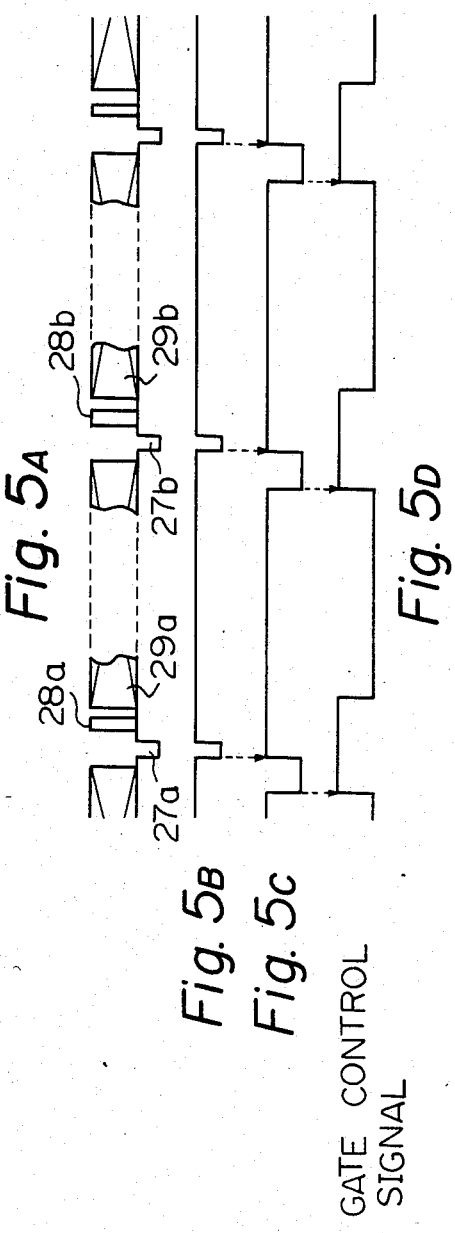

Fig. 6 PRIOR ART
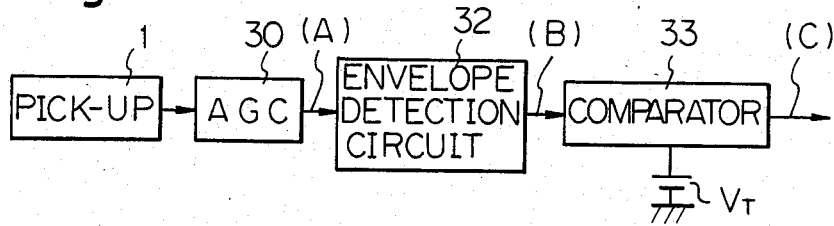
Fig. 7A
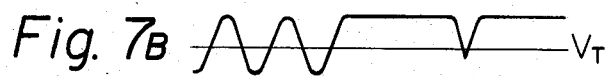
Fig. 7B
Fig. 7C
NON-TRACKING MODE | TRACKING MODE
To
Fig. 8
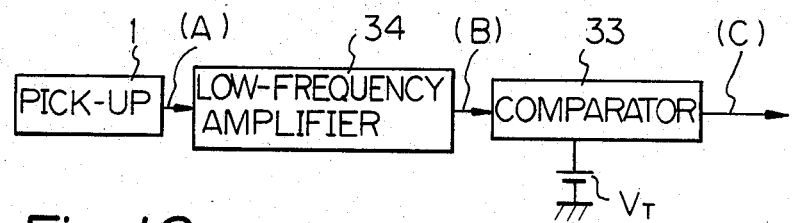
Fig. 10
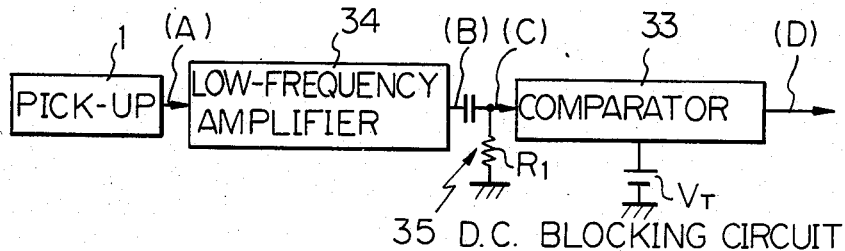
35 D.C. BLOCKING CIRCUIT

PICK-UP POSITIONING APPARATUS FOR DATA PLAYBACK APPARATUS

BACKGROUND OF THE INVENTION

At the present time, equipment for playback of data (e.g. video data) recorded on discs is coming into widespread use. In general, successive portions of the data recorded on such a disc, e.g. successive video frames, are respectively identified by address data which is recorded in a segment of the recording track preceding each of these data portions. This makes it possible to search for a desired track (or portion of the recorded data, if the address of the corresponding track is known), to then read out that data portion from the disc. In the case of a video recording disc, an address is generally recorded on each track of the disc, together with a vertical sync signal. During normal playback operation, a sensing point defined by the pick-up (e.g. a spot of light which is directed onto the recording tracks, in the case of an optical type of recording disc) is held continuously positioned on the recording tracks as the disc rotates, to thereby read out data from the sensing point, with the position of the sensing point relative to the recording tracks being controlled by a servo control system generally referred to as a tracking servo loop. During a search operalion to find a specified address on the recording disc, the sensing point is moved along the direction of a radius of the disc, i.e. such as to successively intersect the recording tracks at right angles, while the disc is rotated.

Two basic methods of searching for a specified address recorded on a recording disc have been employed in the prior art. With one method, the data sensing point is brought close to a desired address position on the disc by successively comparing address data read out from the disc with the specified address data, as the pick-up traverses the recording tracks along a radial direction as described above. When coincidence occurs between the address data thus read out and the specified address, then scanning of the pick-up over the disc is terminated. However various problems arise in practice with such a search method. Firstly, if the data sensing point is made to scan across the recording tracks on the disc at high speed, then it becomes difficult to accurately read out the address data from the segments of the recording tracks in which this data is recorded. Thus, the scanning speed must be held low, so that the search process requires appreciable time. In addition, there is a danger that the pick-up may overshoot the desired address position, since the pick-up will continue to move for a certain amount of time even after address data which coincides with the desired address has been read out and coincidence has been recognized. Thus, in order to implement such a search method in practice, it is necessary to reduce the rate of scanning to a very low value as the pick-up approaches the specified address position. If there is a known relationship between the successive tracks which are traversed by the pick-up during this scanning operation and the address data portions, (e.g. with one address being allocated to each recording track) then it is possible to calculate, during the course of scanning, the number of tracks which remain to be traversed before the specified address position is reached. In such a case it is possible to reduce the scanning speed as that position is approached, in order to avoid the problem of overshoot mentioned above. However in many cases, such a fixed relationship between numbers of tracks and address data does not exist. For example in the case of video disc playback, it may be necessary to search for the address of a chapter, i.e. a portion of the recorded data on the disc which is made up of a number of video frames, occupying a number of recording tracks which is not a fixed parameter.

It can thus be understood that in general, if the method of searching for a specified address position on the disc is carried out by successively reading out recorded addresses as the pick-up is scanned radially across the disc, it is necessary to hold the scanning speed to a very low value, in order to ensure accurate read-out of address data and to avoid overshooting the desired address position.

Another method of searching for a specified address is to compute the number of tracks on the disc between the current position of the pick-up (e.g. a starting position) and the track on which the desired address is recorded. The number of tracks traversed by the pick-up can then be counted as the pick-up is scanned in a radial direction over the disc as described above, with scanning being halted when the number of tracks thus counted becomes identical to the number which has been computed. However as stated above, there is not necessarily a fixed relationship between a specific address position on the disc and the number of recording tracks which must be traversed to reach that position from some other address position (e.g. a starting address position). Thus such a track counting method of address search does not have general applicability.

Another problem arises with a search method in which recorded addresses are successively read out as the pick-up scans radially over the disc, in the case of an optical type of playback apparatus in which a tracking mirror forms part of the tracking servo loop, acting to direct light from a light source (e.g. a laser) onto the recording tracks. If the tracking servo loop is left in operation during this scanning process, then the tracking mirror will successively swing between the limits of its maximum range of movement. Thus, the pick-up will become locked onto a recording track for a brief interval, will then jump over a number of tracks, will again become locked onto another recording track, and so on. Thus with such a method it is only possible to read out address data from a small number of address data segments. If on the other hand the tracking servo loop is held open while scanning is performed, then it becomes difficult to accurately read out address data, since no means are provided to ensure that the pick-up will track along the address data segments on the disc which it encounters during the scanning process.

SUMMARY OF THE DISCLOSURE

It is an objective of the present invention to overcome the problems which arise with prior art methods of positioning the pick-up of a recording disc playback apparatus at a recorded address on a recording disc which corresponds to a specified address, and to provide a pick-up positioning apparatus whereby the pick-up can be brought close to a specified address position with a high degree of accuracy and reliability and without danger of overshooting the desired position, even if the pick-up is moved to the desired position very rapidly.

A pick-up positioning apparatus for a recording disc playback apparatus according to the present invention basically comprises a control circuit, a memory circuit, scanning means for rapidly moving a recording disc and pick-up relative to one another along the direction of a radius of the recording disc, and pick-up position sensing means for producing signals to indicate the current position of the pick-up along said radial direction. When a recording disc is first set on the playback apparatus, the control circuit initiates an address acquisition mode of operation, in which the control circuit causes the scanning means to move the pick-up relative to the recording disc along the direction of a radius of the disc whereby a plurality of addresses recorded in digital data form on segments of the recording tracks are successively read out by the pick-up. As each of these addresses is read out, it is stored, together with the corresponding position of the pick-up as indicated by output signals from the position sensing means, in the memory circuit. In the following, to avoid misunderstanding, an address which is recorded on the disc will be referred to as a disc address, while an address at which data is stored in the memory circuit will be referred to as a memory address. When a disc address and the corresponding position data are are stored in the memory circuit, a specific relationship is established between the memory address at which the disc address is stored and the memory address at which the corresponding position data are stored. This read-out and storage process is continued until the entire area of the disc on which data is recorded has been scanned.

This address acquisition mode of operation, in which scanning across the recording disc is performed at a relatively low speed, need be only entered when a disc is newly set on the playback apparatus (or, in the case of a volatile memory circuit being employed, each time power is applied to the system). Thereafter, each time it is required to search for a specified address recorded on the disc, i.e. to set the pick-up close to the position at which that address data is recorded on the disc, the control circuit is activated to establish a high-speed search mode of operation. In this mode, firstly the disc addresses which are stored in the memory circuit are successively read out, and compared with the desired address until the stored disc address which is closest to the specified disc address is reached. When this occurs, the corresponding position data stored in the memory circuit is read out, and is used as target position data. The control circuit then causes the scanning means to move the pick-up relative to the recording disc along the radial direction, until the output data from the position sensing means becomes identical to the target position data. The pick-up is then left positioned close to the desired address position.

It is also possible to configure a pick-up positioning apparatus according to the present invention such that a tracking servo loop which controls the pick-up such that a data sensing point is positioned on a recording track (e.g. by controlling a tracking mirror as described above) is held open during scanning of the pick-up in the address acquisition mode, except at specific intervals when the data sensing point attains positions at which address data can be read out from the disc, i.e. with tracking lock being established and maintained only while the pick-up is moving along track segments in which address data is recorded. In this way, the problems of overshoot and inaccurate read-out of address data which arise with the prior art are eliminated.

BRIEF DESCRIPTION OF THE DRAWINGS

FIGS. 3(A)–3(C) are graphs showing the relationship between time and the positions of disc addresses which are successively encountered by the pick-up during radial scanning across a recording disc;

FIG. 4 is a block circuit diagram of a modification of the embodiment of FIG. 1, whereby a tracking servo loop is set into operation prior to the commencement of read-out of address data from a recording track;

FIGS. 5(A), (B), (C) and (D) are waveform diagram for assistance in describing the system of FIG. 4;

FIG. 6 is a block circuit diagram of a prior art type of tracking detection signal generating circuit;

FIGS. 7(A)–7(C) are waveform diagrams for illustrating the operation of the circuit of FIG. 6;

FIG. 8 and FIG. 10 are block circuit diagrams of modifications to the prior art circuit of FIG. 6;

DESCRIPTION OF THE PREFERRED EMBODIMENTS

Figure 1:
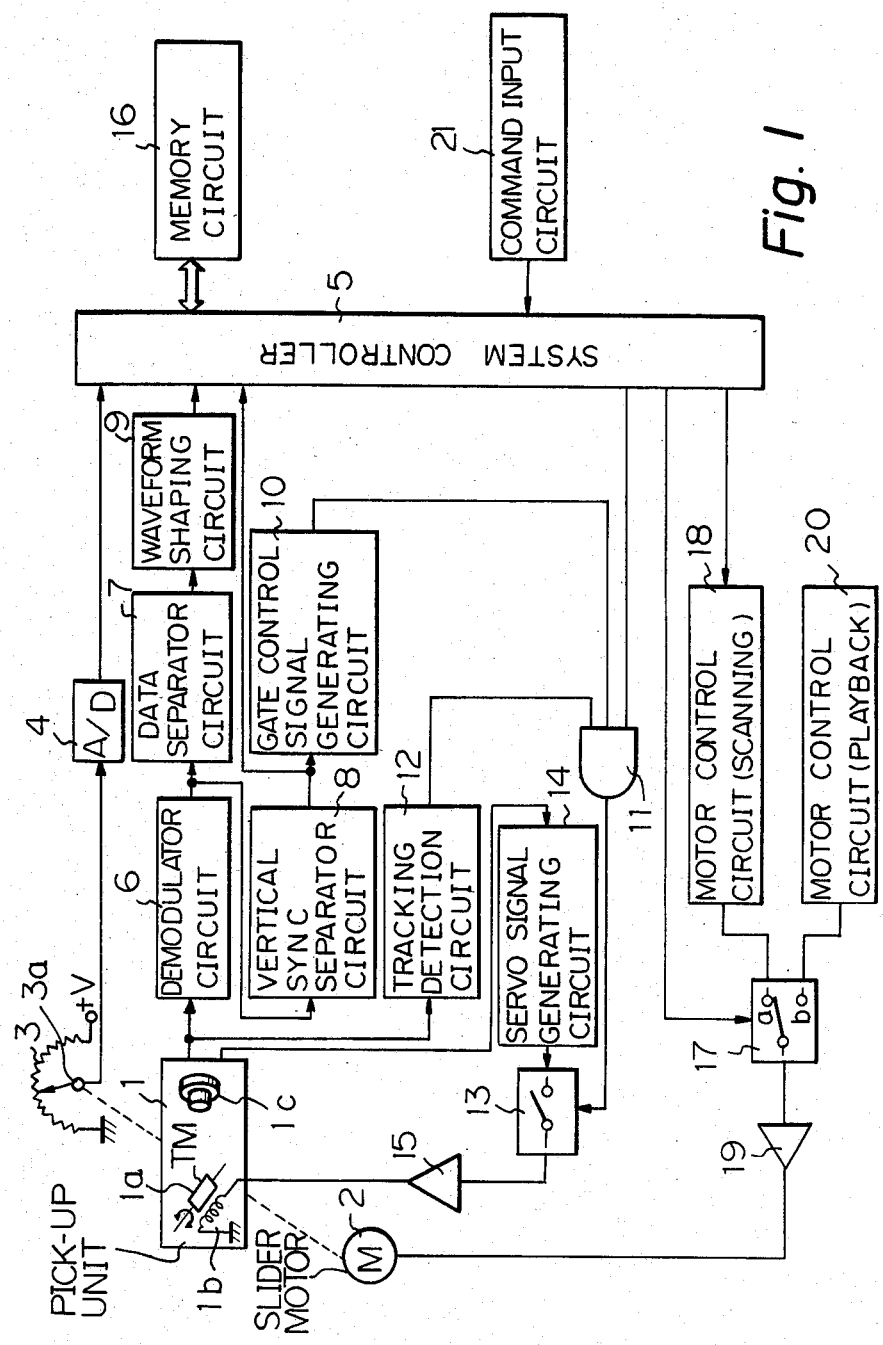
FIG. 1 is a block circuit diagram of an embodiment of a pick-up positioning apparatus according to the present invention.

Referring first to FIG. 1, a block circuit diagram is shown of an embodiment of a pick-up positioning apparatus according to the present invention. The embodiment is provided in an optical type of video disc player, i.e. a disc player in which light from a source such as a laser is focussed to a small spot upon the recording disc tracks, with light thereby reflected from the tracks being converted into an electrical signal by opto-electric transducer means and with a video signal component and sync signal components of this transducer output signal being derived by suitable demodulator and sync signal separation circuits. In this embodiment, the data sensing point (i.e. the point on the recording tracks from which data is read out) is constituted by the focussed light spot referred to above.

Numeral 1 denotes a pick-up, for read-out of data from the recording tracks, comprising a light source (not shown in the drawings) for producing the light spot which forms the data sensing point, a tracking mirror 1a which directs light from the light source onto the recording tracks to form that light spot and whereby the position of the spot relative to the recording tracks can be varied by movement of the light spot along a radius of the recording disc within a limited range, and a mirror drive coil for controlling movement of the tracking mirror and hence the light spot in response to drive signals applied thereto. Pick-up 1 further comprises one or more opto-electric transducer elements indicated as 1c, for reading out recorded converting light reflected from the light spot, i.e. from the data sensing point, into a modulated RF signal, and also for producing signals indicative of the position of the data sensing point relative to the recording tracks. Pick-up 1 is supported on a scanning mechanism (not shown in the drawings) which is driven by a slider motor 2 to move pick-up 1 in a predetermined direction along a radius of the recording disc (e.g. from the outer periphery of the area of the disc on which data are recorded to the inner periphery). During normal playback operation of the system, this radial movement of the pick-up is very gradual, however during address data storage and search operations described hereinafter the pick-up is moved along this radial direction much more rapidly, such as to successively traverse the recording tracks substantially at right angles. Such rapid radial movement will be referred to in the following as scanning, while slider motor 2 and the scanning mechanism will be collectively referred to as scanning means. It should be noted that it would be equally possible to implement such a scanning mechanism by moving the recording disc while holding the pick-up stationary.

Numeral 3 denotes a potentiometer which has a contact arm 3a that is coupled to move with pick-up 1, whereby an analog signal in the form of a varying voltage is output by potentiometer 3 as position data which indicates the position of pick-up 1 along the radial direction referred to above, i.e. with respect to the center of rotation of the recording disc. This analog position data from potentiometer 3 is converted into digital form by an A-D converter circuit 4.

Overall operation of the positioning apparatus is controlled by a system controller 5, which receives the digital position data from A-D converter circuit 4 as one input thereto.

The modulated RF signal referred to above from pick-up 1 is input to a demodulator circuit 6 for demodulation. The demodulated output signal from circuit 6 is input to a data separator circuit 7, which separates the signal components constituting digitally encoded address data, which is transferred through a waveform shaping circuit 9 to be input to system controller 5. The output signal from demodulator circuit 6 is also input to a sync separator circuit 8, which extracts the vertical sync signal pulses from that signal. The vertical sync signal pulses are input to system controller 5.

Generally speaking, the recording format of video discs is such that each recorded frame (i.e. between successive vertical sync pulses) begins with a vertical sync pulse which is followed by an address, encoded as a series of bits, with the vertical sync pulse and address data being recorded within the vertical blanking interval of the frame. The recorded frames are successively numbered, and the address data may designate either a frame number or a chapter number (a chapter comprising an arbitrary number of frames). One frame, and hence one frame number, is generally recorded on each recording track, so that addresses recur at 360° intervals in the case of a CAV (constant angular velocity) type of recording disc. In this case, the segments of recording track on which the addresses are recorded will be arrayed along a radial direction of the disc.

System controller 5 is operable to establish three modes of operation of the positioning apparatus, namely a normal playback mode in which pick-up 1 continuously follows the recording tracks, to read out video data and sync pulses, an address acquisition mode in which address data and position data are read from the recording disc and are stored in a memory circuit 16 together with corresponding pick-up position data, and a rapid search mode, in which pick-up 1 is rapidly scanned across the recording disc to reach a position close to a recording track whose address has been specified. During address acquisition mode operation, as described in more detail hereinafter, the data sensing point of pick-up 1 successively becomes positioned at the start of each of a plurality of segments of recording track on which addresses are recorded. A gate control signal generating circuit 10 serves to produce a pulse at a high logic level potential (hereinafter abbreviated to H level) at each timing when the data sensing point becomes thus positioned during address acquisition mode scanning, and which returns to a low logic level potential (hereinafter L level) after a fixed time interval. An example of a suitable circuit for gate control signal generating circuit 10 will be described hereinafter. Numeral 12 denotes a tracking detection circuit, which produces an output signal at the H level when the data sensing point is positioned directly on a recording track, and which goes to the L level when the data sensing point is positioned between the recording tracks. These output signals from tracking detection circuit 12 and gate control signal generating circuit 10 are applied respectively to inputs of an AND gate 11, while an output from system controller 5 is applied to a third input of AND gate 11. The latter output from system controller 5 remains at the H level so long as the system is operating in the address acquisition mode with pick-up 1 being scanned across the recording disc, and is otherwise held at the L level. Thus, the output of AND gate 11 only goes to the H level under the condition that the data sensing point is positioned on a recording track, the data sensing point is moving along a section of recording track on which address data is recorded, and that scanning of pick-up 1 is taking place with the system operating in the address acquisition mode. A tracking servo loop switch 13 is controlled by the output from AND gate 11 such that when that output is at the H level switch 13 is closed, with switch 13 being otherwise left in the open state during address acquisition mode operation. The tracking servo loop switch 13 is connected between the output of a servo signal generating circuit 14 and an amplifier 15. Servo signal generating circuit 14 is coupled to pick-up 1 such as to generate a servo signal which varies in accordance with the position of the data sensing point relative to a recording track, i.e. in accordance with a tracking error which represents an amount of deviation of the data sensing point from a position directly on a recording track. This servo signal, amplified by amplifier 15 when switch 3 is closed, is applied to drive coil 1b of tracking mirror 1a, to thereby move tracking mirror 1a and hence the data sensing point such as to cancel any tracking error and hence establish a tracking lock condition in which the data sensing point is held accurately positioned on a recording track as the disc rotates. The servo signal generating circuit 14, tracking servo loop switch 13, amplifier 15 and the combination of drive coil 1b and tracking mirror 1a constitute a tracking servo loop, which is made operative and inoperative when switch 13 is set in the closed and opened states, respectively.

Numeral 16 denotes a memory circuit in which addresses read out from a recording disc and corresponding data sensing point position data are stored. In order to avoid confusion, an address recorded on a recording disc will be referred to as a disc address, while an address of memory circuit 16 in which a disc address or position data are stored will be referred to as a memory address.

A changeover switch 17 is controlled by an output signal from system controller 5, such as to be set to an "a" contact position, as shown in FIG. 1, when the system is operating in the address acquisition mode or the high-speed search mode, and to be set to the "b" position thereof when the system is operating in the normal playback mode. When changeover switch 17 is set to to the "a" contact position, an output signal from a motor control circuit 18 applies a fixed level of current through an amplifier 19 to drive slider motor 2. The level of current thus applied to slider motor 2 is determined by control signals applied by memory circuit 5 to motor control circuit 18, to thereby determine the rate at which pick-up 1 is scanned at a fixed speed across the recording disc during address acquisition mode operation and rapid search operation, respectively. Numeral 21 denotes means for inputting data and command signals to system controller 5, e.g means for input of data representing a disc address at which pick-up 1 is to be positioned by a rapid search operation.

Numeral 20 denotes a motor control circuit from which current is applied through changeover switch 17 and amplifier 19 to drive slider motor 2 when the system is operating in normal playback mode. This motor control circuit 20 will generally constitute part of a servo control loop which is coupled to pick-up 1, however description of this will be omitted herein.

The operation of the circuit of FIG. 1 is as follows. Firstly, when a recording disc is set on the turntable of the disc player apparatus, and has reached a predetermined speed of rotation, system controller 5 produces control signals to establish the address acquisition mode of operation. That is to say, signals from system controller 5 set changeover switch 17 to the a contact position, and activate motor control circuit 18 to apply a drive current through amplifier 19 to slider motor 2. This drive current is of fixed level, such that slider motor 2 drives pick-up 1 to rapidly scan across the recording disc at constant speed. This speed may be such that, for example, the data sensing point travels from the outer periphery to the inner periphery of the program area of the recording disc in 4 seconds. During this scanning process, each time the data sensing point attains a position on a recording track which is the start of a track segment on which a disc address is recorded, then an H level output signal is produced by gate control signal generating circuit 10, whereby an H level output is produced by AND gate 11 as described above. The tracking servo loop is thereby closed, and tracking lock is thereby established so that the data sensing point is held positioned on the recording track while scanning at constant speed by pick-up 1 continues (i.e. by tracking mirror 1a swinging to move the data sensing point in the opposite direction to the scanning direction) until that disc address data has been read out by pick-up 1. The output signal from AND gate 11 thereupon returns to the L level, thereby opening the tracking servo loop. The address data which has been read out by pick-up 1 is converted into a train of binary pulses by demodulator circuit 6, data separator 7 and waveform shaping circuit 9, and is then stored in memory circuit 16. In addition, a vertical sync pulse, which has been recorded on the disc immediately preceding the disc address, is output from vertical sync separator circuit 8, and input to system controller 5 and to gate control signal generating circuit 10.

As scanning of pick-up 1 continues, the above disc address read-out process is repeated each time the data sensing point attains a recording track position at which disc address data is recorded. In this way, a plurality of disc addresses are successively read-out from the recording disc, and are stored in successive memory address locations of memory circuit 16, until the entire program area of the recording disc has been scanned. Each time a disc address is read out and stored in this way, position data representing the position of the data sensing point along the scanning direction is output from A-D converter circuit 4 in binary code form, and is stored in memory circuit 16. The memory address at which each disc address is stored is linked in a predetermined manner to the memory address at which the corresponding position data is stored, as described in detail hereinafter.

Only a proportion of the total number of disc addresses recorded on the disc are read out and stored by the address acquisition mode scanning described above. The number of disc addresses which can be stored will or course be determined by the storage capacity of memory circuit 16, while the number of disc addresses which are read out during the address acquisition mode scanning is determined by the scanning speed.

Upon completion of address acquisition mode scanning, and storage of disc address and position data in memory circuit 16, the system enters a waiting state, i.e. in which the normal playback mode can be entered and the video data read out from the disc. Thereafter, if it is required to position pick-up 1 close to a recording track on which a specific disc address is recorded, then data representing that disc address are input to system controller 5 from the command input circuit means 21, together with a command which causes system controller 5 to establish the high-speed search mode. When this occurs, a read-out status of memory circuit 16 is established, and read-out of the disc addresses stored in successive memory addresses begins, e.g. by successively incrementing an address counter which produces memory address signals. As each disc address is read out from memory circuit 16 it is compared with the specified disc address. When the stored disc address that is closest to the specified disc address is read out of memory circuit 16, then further read-out of disc addresses from memory circuit 16 is halted, and the position data which corresponds to this closest stored disc address is read out of memory circuit 16, utilizing the relationship between the memory addresses of stored disc addresses and corresponding position data mentioned above. The position data thus read out is thereafter utilized as target position data. That is to say, a control signal from system controller 5 is applied to motor control circuit 18 whereby a drive current is applied to slider motor 2 causing the scanning mechanism to scan pick-up 1 rapidly across the recording disc tracks. As this scanning takes place, the resultant values of position data produced by A-D converter circuit 4 is successively compared with the target position data, and when these reach coincidence, the control signal applied by system controller 5 to motor control circuit 18 is terminated, so that further scanning movement of pick-up 1 is halted.

The data sensing point of pick-up 1 will now be positioned on or close to the recording track on which the specified disc address is recorded. Since it is not necessary to perform read-out of disc address data or counting of tracks traversed by the data sensing point during the latter scanning process, the speed of scanning can be made substantially higher than that employed during address acquisition mode operation. In addition, since the relationship between the current position of pick-up 1 during this scanning process and the target position is accurately known at all times, the time required to perform such a high-speed search scanning operation can be further minimized by reducing the scanning speed as the target position is approached, so as to avoid the danger of overshoot. Thus although a time of the order of 4 seconds, for example, may be required to complete address acquisition mode scanning of pick-up 1, subsequent high-speed search operations can be performed extremely rapidly and with a high degree of accuracy and reliability.

In the above it has been assumed that the embodiment is intended for use with CAV (constant angular velocity) type video discs, i.e. with the speed of rotation of the disc being held constant during normal playback. However the embodiment could equally be adapted for use with CLV (constant linear velocity) discs, in which the speed of angular rotation of the disc varies continuously as the pick-up travels from the outer to the inner periphery of the program area. The recording track segments on which disc addresses are recorded on a CLV disc are not arrayed along a common radius of the disc, as is the case with a CAV disc (assuming the one address is recorded on each track), and as a result the time required to complete address acquisition mode scanning would in general be longer for a CLV disc than a CAV disc. However once disc address data has been stored in the memory circuit by address acquisition mode operation, high-speed search operations can thereafter be performed as rapidly for a CLV disc as for a CAV disc system.

With an optical type of video disc, the length of a radial segment extending from the inner to the outer periphery of the program area on the disc is approximately 90 mm, with approximately 54,000 recording tracks being contained within this 90 mm distance. Assuming that the disc addresses recorded on the disc are frame numbers, and that one frame number is recorded on each recording track, and assuming that pick-up 1 is moved at a constant speed during address acquisition mode scanning such that a total of 4 seconds are taken to scan from the outer to the inner periphery of the program area, and moreover assuming that the speed of rotation of the disc is 1800 rpm, then the data sensing point will successively traverse a total of $(1800/60) \times 4 = 120$ frame numbers. The spacings between the positions on the disc at which these frame numbers are recorded will be $90/120 = 0.75$ mm, so that a positioning accuracy of approximately $\pm 0.37$ mm will be provided. This is a satisfactory value, since the range of movement of the data sensing point that can be produced by swinging tracking mirror 1a will typically be approximately identical.

It is possible to provide increased positioning accuracy if the number of disc addresses that are stored in memory circuit 16 during the address acquisition mode operation is increased, i.e. by providing increased storage capacity in memory circuit 16 and utilizing a slower speed of scanning pick-up 1 during address acquisition. For example if the scanning time is increased from 4 to 8 seconds, the positioning accuracy will be doubled. However it will be necessary to correspondingly double the storage capacity of memory circuit 16.

The disc addresses are recorded in BCD code. A frame number may for example be recorded in the format $FX_1X_2X_3X_4X_5$, and a chapter number in the format $8X_1X_2X_3DDD$, where F and D are fixed hexadecimal digits (i.e. decimal 15 and 13 respectively) and $X_1$ to $X_5$ denote variable BCD digits, with $X_1$ being the most significant digit in the case of both frame numbers and chapter numbers. A frame number or chapter number thus comprises a set of six digits, each formed of four bits. If the first digit of a disc address to be read out from the disc during the address acquisition mode operation is $F_{(hex)}$ then system controller 5 will recognize that the address is a frame number, while if the first digit is 8 then the address will be recognized as a chapter number.

Figure 2:
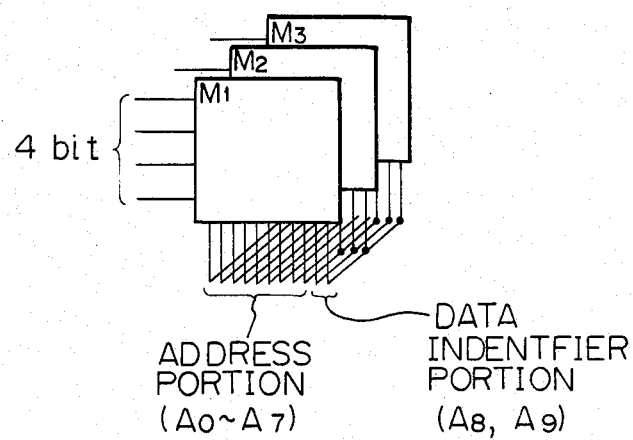
FIG. 2 is a simplified circuit diagram to illustrate the operation of a memory circuit used in the embodiment of FIG. 1.

FIG. 2 shows an example of a configuration for memory circuit 16 suitable for storing disc address data of the form described in the previous paragraph. This can conveniently comprise a set of three memory units, designated as M1, M2 and M3, each having a storage capacity of 1024 bits. Assuming that 120 disc addresses (with corresponding position data) are to be stored in memory circuit 16, then it is only necessary to store the three most significant BCD digits $X_1X_2X_3$ of each frame number therein (i.e. stored respectively in memory sections M1, M2 and M3) and to store the two BCD digits $X_1X_2$ of a chapter number (e.g. in memory sections M1 and M2). As illustrated in FIG. 2, a memory address is made up of 10 bits, A0 to A9, with A0 being the MSB. A memory address is handled as two parts, namely an address portion (bits A0 to A7) and a data identifier portion (bits A8 and A9). The data identifier portion of a memory address determines the type of data which is stored in that address, e.g. a frame number, chapter number, position data corresponding to a frame number, or position data corresponding to a chapter number, respectively. This relationship between the data identifier portion and stored data can be as shown in Table 1 below.

TABLE 1

|  | A8 | A9 |
| --- | --- | --- |
| Frame number | 0 | 0 |
| Position data for frame number | 0 | 1 |
| Chapter number | 1 | 0 |
| Position data for chapter number | 1 | 1 |

It will be assumed that the digital position data which is output by A-D converter circuit 4 comprises 8 bits, which will be designated as D7 to D0. These can be conveniently stored as two sets of 4 bits, in two of the memory units of memory circuit 16, e.g. M2 and M3 respectively.

When the address acquisition mode is entered and read-out of successive disc addresses during rapid scanning of the pick-up begins, as described above, the memory address count is set to 0000000000 (i.e. all of bits A0 to A9 set to 0). If the first disc address read out from the disc is a frame number, then the memory address bits are set to 0000000001, and the data stored in that address, whereas if the data is recognized as a chapter number then the memory address bits are set to 0000000010, and the read-out data stored. In addition, the position data output from A-D converter circuit 4 at that time, representing the position of the recording track on which the latter disc address is recorded, is stored in memory address 0000000001 (if a frame number has been read out) or 0000000011 (if a chapter number has been read out). When the next disc address is read out, the portion (A0 to A7) of the memory address is incremented by one, and the data identifier bits are set as described above in accordance with whether the data represents a frame number or chapter number. The corresponding position data are then stored in a memory address for which address bits (A0 to A7) are unchanged and data identifier bits A8, A9 are set as described above in accordance with the type of disc address data read out. This process is repeated successively until all of the 120 disc addresses have been read out and stored in memory circuit 16 together with the corresponding position data.

This process is illustrated by Table 2 below.

TABLE 2

| A0 to A7 | A8, A9 | M1 | M2 | M3 |
|---|---|---|---|---|
| . | | | | |
| . | | | | |
| . | | | | |
| 00001010 | 00 | $X_1$ | $X_2$ | $X_3$ |
| 00001010 | 01 | 0 | $D_7D_6D_5D_4$ | $D_3D_2D_11D_0$ |
| 00001011 | 10 | $X_1$ | $X_2$ | D |
| 00001011 | 11 | 0 | $D_7D_{\ 6}D_5D_4$ | $D_3D_2D_1D_0$ |

As shown in Table 2, when the 10th read-out of a disc address takes place during address acquisition mode scanning, that disc address is stored in memory address 0000101000, i.e. the data read out has been recognized as a frame number. The corresponding position data is then stored in memory address 0000101001, i.e. with the identifier bits of the address A8, A9 being set as shown in Table 1 above. Similarly when the 11th disc address is read out during the scanning process, this is stored in memory address 0000101110, since it has been recognized by system controller 5 to be a chapter number, and the corresponding position data is stored in memory address 0000101111. Table 2 also shows how the digits of a frame number and a chapter number, and corresponding position data digits, are respectively stored in memory sections M1, M2 and M3.

The process of searching for a specified disc address will now be described. First, a specified disc address (i.e. frame number or chapter number) is input to system controller 5 from command input circuit means 21, together with a command designating that the system is to be set in a high-speed search mode operation. The memory address bit count is then set to 0000000000, and successive up-counting of the address bits then begins, to thereby successively read out the contents of memory circuit 16 with the data read out from each memory address being successively compared with the specified disc address. When the stored disc address which most closely matches the specified disc address is reached, then the data identifier bit A9 of the address of that nearest disc address is set to 1, and the contents of the memory address thus established are read out of memory circuit 16. The data thus read out will be the position data corresponding to the stored disc address which is closest to the specified disc address, as can be understood from Table 2, and is now used as target position data. High speed scanning of pick-up 1 across the recording disc is then begun, with the position data output from A-D converter circuit 4 being successively compared with the target position data, and when coincidence is reached, pick-up, 1 is halted. It can thus be understood that the address acquisition mode and the high-speed search operation can be implemented in a very simple manner, using the memory circuit and address bit configuration described above, since the memory address of each frame number or chapter number is automatically linked to the memory address of the corresponding position data. However various arrangements for data storage can be envisaged other than that described hereinabove.

The described embodiment could also be modified in various other ways. For example, an optical or electromagnetic transducer could be utilized instead of potentiometer 3 to produce position data. In addition, transducer means could be utilized which produces output position data directly in digitally encoded form, rather than analog form. Alternative, rather than converting analog position data into digital position data, to be compared with digital position data read out from memory circuit 16, it is equally possible to perform digital-to-analog conversion of digital position data output from memory circuit 16, and to compare the resultant analog data with the output data from potentiometer 3.

In addition, the present invention is not limited to use with optical types of recording disc, but is also applicable to disc players which employ electrostatic or other methods of data read-out.

Figure 3A:
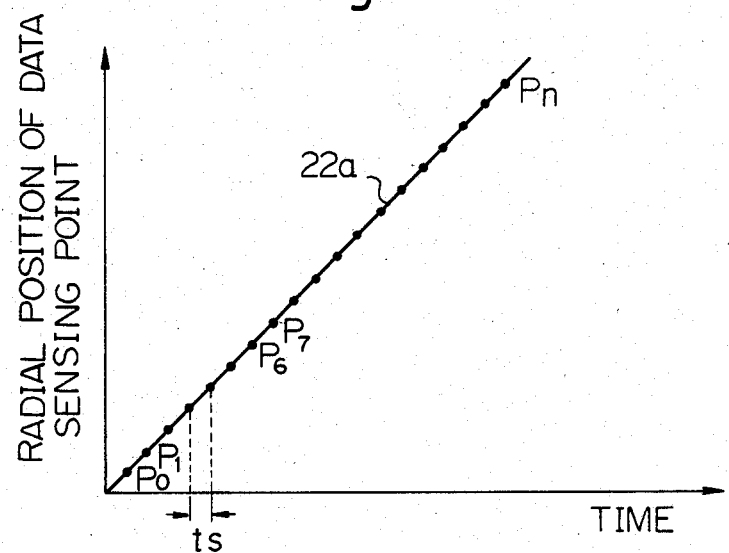

As stated above, gate control signal generating circuit 10 produces output signals which determine the starting point and duration of each of the time intervals in which the tracking servo loop is made operative, while address acquisition mode scanning is in progress. The reasons for this will now be described, referring to FIGS. 3A, 3B and 3C. During rapid scanning of pick-up 1 across the recording disc to perform successive read-out of disc addresses to be stored in memory circuit 16, if the tracking servo loop were to be held inoperative, i.e. with switch 13 open, then tracking mirror 1a would remain stationary with respect to pick-up 1, positioned at the center of the range over which the mirror can swing while track lock is being maintained. In this case, with pick-up 1 moving at constant speed, the relationship between elapsed time and the position of the data sensing light spot (along the scanning direction) would be as denoted by numeral 22a in FIG. 3A, i.e. a linear relationship. $P_o$, $P_1$, ... $P_n$ denote successive positions along the data sensing light spot scanning path at which the data sensing light spot crosses a recording track, with the time interval during which the data sensing light spot scans over successive tracks being indicated as $t_s$. Such a method could only be employed if such scanning were to be carried out at a very low speed. Otherwise, when the data sensing light spot reaches the start of a track segment on which address data is recorded and read-out of this data begins, the continued scanning movement of the data sensing light spot (since the tracking mirror remains stationary with respect to pick-up 1) will move that point so rapidly past the track on which the address data are recorded that only a part of the data will be read out. Thus such a method is not practical if the address acquisition mode data read-out is to be completed within a reasonably short period of time.

If it is attempted to overcome this problem by leaving the tracking servo loop operative while the address acquisition mode scanning is in progress (i.e. with switch 13 held closed), then other problems will arise. The relationship between the position of the data sensing light spot along the scanning path and time will in that case be of the general form designated by numeral 22b in FIG. 3B. The tracking servo loop will alternately achieve track lock on a recording track, will maintain this track lock condition (i.e. with tracking mirror 1a moving the data sensing light spot in the opposite direction to the scanning direction) until the limit of the range of movement of tracking mirror 1a is reached.

Track lock will then be lost, and tracking mirror 1a will swing back towards the center of its range of movement. After some indeterminate interval, track lock will again be established, then the process described above will be repeated. As a result, the data sensing light spot will alternately be held positioned on a recording track, will then jump over a number of recording tracks, will again be held positioned on a recording track, and so on, as scanning of the pick-up proceeds. It will be assumed for example that $P_7$ corresponds to the start of a recording track segment on which a disc address is recorded, and would be reached by the data sensing light spot if scanning were performed with the tracking mirror held stationary (as in the case of FIG. 3A). With the tracking servo loop held operational during scanning, track lock might be initiated when the data sensing light spot reaches the preceding recording track, i.e. reaches point p6 in FIG. 3B. Lock will then be maintained for a time interval, indicated as $t_m$, and then will be lost. The data sensing light spot will thereby jump rapidly over the next recording track, corresponding to position $P_7$, and will thereby miss the track segment referred to above on which address data is recorded. Thus, accurate read-out of address data from the disc cannot be achieved with such a method.

FIG. 3C shows the corresponding relationship for the embodiment of FIG. 1. It will be assumed that $P_7$ and $P_{14}$ correspond to points along the scanning path of the data sensing light spot (assuming no movement of tracking mirror 1a relative to pick-up 1) at which the data sensing light spot encounters the start of a recording track segment on which disc address data is recorded. Initially, the data sensing light spot is scanned across the recording disc with the tracking servo loop held inoperative (switch 13 held open), so that the relationship between time and successive data sensing light spot positions is linear. Immediately prior to point $P_7$ being reached, switch 13 is closed to set the tracking servo loop in operation, in response to an output signal from gate control signal generating circuit 10 as described hereinabove. Track lock is thereby established, and read-out of the address data of the recording track corresponding to point $P_7$ is begun (with scanning movement of pick-up 1 as a unit being continued). After a time interval $t_L$ has elapsed, which is made sufficiently long to ensure that all of the address data has been read out, switch 13 is opened to terminate the track lock condition. Tracking mirror 1a then swings back towards the center of its range of movement, and linear scanning of the data sensing light spot along the disc is resumed. Subsequently, the tracking servo loop is again set in operation immediately prior to the data sensing light spot reaching point $P_{14}$, and the process described above for point $P_7$ is repeated, to read out the next disc address.

With an optical type of recording disc pick-up system, track lock is most rapidly established if the tracking servo loop is set in operation with the tracking mirror positioned close to the center of its range of movement, since in this condition the beam of light which forms the light spot constituting the data sensing light spot will pass through the optical system (which serves to focus the light spot) close to the central axis of that optical system. Thus, focussing of the light spot is most effectively achieved in this condition, leading to maximum speed of reaching track lock. This condition for rapid achievement of track lock is met by the system of the present invention described above, since the tracking mirror is positioned close to the center of its range of movement immediately prior to the times at which switch 13 is closed to set the tracking servo loop in operation, so that track lock is very rapidly and reliably established. In addition, since the tracking servo loop is held inoperative at times other than when read-out of disc address data is in progress, the danger of overshoot of address positions that arises when the tracking servo loop is left in continuous operation as described above, is eliminated. Scanning of the recording disc during the address acquisition mode operation can therefore be carried out at high speed, with very reliable read-out and storage of disc address data.

Various methods can be envisaged for implementing gate control signal generating circuit 10. As stated above, each address recorded on a video recording disc is generally preceded by a vertical sync pulse. An example of a gate control signal generating circuit based on this fact is shown in block diagram form in FIG. 4, in which two MMVs (monostable multivibrators) 24 and 25 are connected to form a gate control signal generating circuit. Vertical sync separator circuit 8 comprises a composite sync separator section 8a and a vertical sync separator section 8b. The output signal from demodulator circuit 6 in FIG. 1 is a composite video signal, containing sync signal and video signal components, which is input to composite sync separator section 8a. The resultant horizontal and vertical sync signal components output from section 8a are input to vertical sync separator section 8b, to thereby produce a train of vertical sync pulses indicated as signal (B), which are input to MMV 24. FIG. 5(A) shows the form in which data is recorded on the disc, i.e. illustrates the data components which are successively read out by pick-up 1 during normal playback operation. At the start of each frame, a vertical sync pulse is recorded, e.g. 27a, followed by the address of that frame (the frame number), e.g. 28a, then a video data portion e.g. 29a. For the purpose of explanation it will be assumed in the following that the start of vertical sync pulse 27a corresponds to position $P_7$ in the graph of FIG. 3C, i.e. that address portion 28a is to be read out by pick-up 1 during address acquisition mode scanning, and that similarly the start of vertical sync pulse 27b corresponds to point $P_{14}$ in FIG. 3C, i.e. that address portion 28b is the next disc address to be read out during that scanning process. Due to an H level output pulse from MMV 25 (produced as described hereinafter) which begins shortly before vertical sync pulse portion 27a is read out, the output of AND gate 11 closes switch 1 to 13 thereby set the tracking servo loop in operation. Track lock is thereby rapidly established, so that vertical sync pulse 27a is read out by pick-up 1a, as shown in FIG. 5(B). The leading edge of this vertical sync pulse triggers MMV 24, whose output signal (shown in FIG. 5(C) goes from the L to the H level, and remains at that level for a predetermined time. This time interval is set such that signal (C) returns to the L level shortly before the next read-out of address data is to take place, i.e. shortly before the data sensing light spot reaches the recording track position at which vertical sync pulse 27b is recorded. That is, the output from MMV 24 remains at the H level for a time interval corresponding to the time difference between points $P_{14}$ and $P_7$ in FIG. 3C. When the output of MMV 24 then falls to the L level, MMV 25 is triggered, so that the output signal from MMV 25 (shown in FIG. 5(D)) goes from the L to the H level, to thereby again set the tracking servo loop in operation by closing switch 13.

The output from MMV 25 remains at the H level for a time which is sufficiently long to ensure complete read-out of address data, i.e. address data portion 28b, then returns to the L level to again open the tracking servo loop. While the MMV 25 output is at the H level, MMV 24 is again triggered, by the vertical sync pulse corresponding to 27b, so that the process described above is repeated consecutively until all of the disc addresses to be stored during the address acquisition mode scanning have been read out.

It can thus be understood that the H level output pulses from MMV 25 can constitute the gate control pulses from gate control signal generating circuit 10 shown in FIG. 1, whereby the tracking servo loop is only set in operation during time intervals in which address data are to be read out from the disc during the address acquisition mode scanning.

It is an important feature that track lock is established at a timing prior to each vertical sync pulse portion which is to be read out, prior to reading out the succeeding address data. Failure to establish track lock when a vertical sync pulse is to be read out may result in noise being output from pick-up 1, which can cause random triggering of MMVs 24 and 25. In addition, a certain amount of time is required for tracking servo loop operation to reach a stable state, so that it is necessary to initiate the tracking servo loop operation prior to the time at which the vertical sync pulse and then the address data are to be read out.

Various other methods of implementing gate control signal generating circuit 10 can be envisaged. For example as stated hereinabove, the disc addresses recorded on a CAV disc are successively arrayed along a common radius of the disc. Thus if the disc is always mounted on the turntable at a fixed angular position with respect to the turntable, then signal generating means of the photo-electric or electromagnetic type (e.g. coupled to the turntable or to the spindle motor shaft) can be used to generate a pulse once in each revolution of the turntable. By counting these pulses by a suitable count ratio (determined by the ratio of the number of disc addresses recorded on the disc to the number of disc addresses which are read out during address acquisition mode scanning), signals can be generated to be applied as gate control signals to AND gate 11, i.e. having a timing and duration as illustrated in FIG. 5(D).

The requirements for tracking detection circuit 12 in the embodiment of FIG. 1 are as follows. This circuit should produce an output signal which reliably goes to a first state (e.g. a high logic level) when the data sensing light spot is positioned on the recording track, and goes to a second state (e.g. a low logic level) at all other times. FIG. 6 is a block circuit diagram of a prior art type of tracking detection circuit for this purpose. The RF signal which is output from a pick-up 1 is applied to an AGC (automatic gain control) amplifier 30, to thereby produce an output signal "A" whose amplitude is unaffected by factors such as changes in the intensity of light from the light source of the pick-up, i.e. as shown in the waveform diagram of FIG. 7(A). In FIG. 7(A) to (C) it is assumed that the pick-up is scanning across successive recording tracks prior to a time point $T_0$, and that track lock on one of the recording tracks is achieved at $T_0$. The output signal from AGC circuit 30 is input to an envelope detection, circuit 32, to produce the output shown in FIG. 7(B). This is compared in level with a reference voltage $V_t$ by a comparator circuit, the level of reference voltage $V_t$ being set approximately midway between the maximum and minimum levels of signal (B) from circuit 32. The resultant output signal from comparator circuit 33 goes to a high level when the RF signal level from pick-up 1 is high, i.e. when the data sensing light spot is positioned on the a track, and goes to a low level otherwise, i.e. when track lock is lost. Thus a series of pulses are output from the comparator circuit as the data sensing light spot successively traverses recording tracks in the interval prior to $T_0$, while the comparator output level should ideally remain at the high level after time $T_0$. However in practice, any AGC circuit has a relatively slow speed of response to sudden changes in input signal level. Thus if the light reflected from the recording track to pick-up 1 should suddenly drop, e.g. due to particles or pitting on the track surface, or momentary drop-out, then a large change in the output from AGC circuit 30 will result, as shown in FIG. 7 (B). This will result in a corresponding change in the output level from comparator circuit 33, producing an erroneous indication that track lock has been lost. This is a serious disadvantage which arises in practice when an arrangement such as that of FIG. 6 is used to produce a tracking detection signal. In addition, it has the disadvantage of requiring a complex AGC circuit.

Figure 9A:
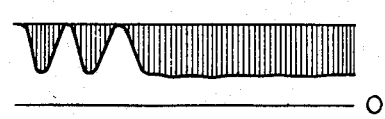
FIGS. 9(A), 9(B) and 9(C) and FIGS. 11(A)–11(D) are waveform diagrams for illustrating the operation of the circuits of FIGS. 8 and 10 respectively.
Figure 9B:
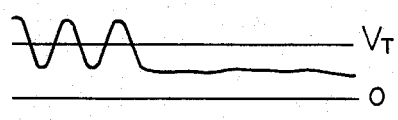
Figure 9C:
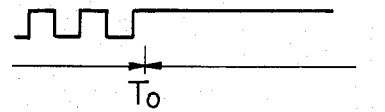

If it is attempted to overcome these problems by eliminating the AGC amplifier and to use a low-frequency amplifier (i.e. a combination of a amplifier and low-pass filter) as indicated by numeral 34 in the circuit of FIG. 8, then other problems will arise. The RF signal waveform used in such a case is shown in FIG. 9(A), and the resultant output signal from LF amplifier 34 in FIG. 9(B). In this case the level of a reference voltage $V_t$ is set midway between the maximum and minimum levels of the output signal from LF amplifier 34, for comparison by comparator circuit 33. However these maximum and minimum levels of the amplifier 34 output signal will vary substantially in practice, due to changes in the intensity of light output from the light source incorporated in pick-up 1, changes in reflectance of the recording disc surface, etc. Thus it is not possible to maintain the value of $V_t$ such as to be accurately midway between the maximum and minimum levels of the output from LF amplifier 34, so that reliable operation of such a circuit over a long period of time is very difficult to ensure.

Figure 11A:
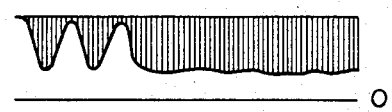
Figure 11B:
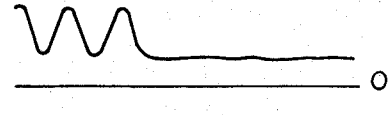
Figure 11C:
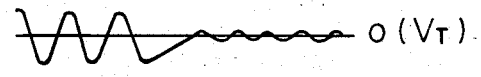
Figure 11D:
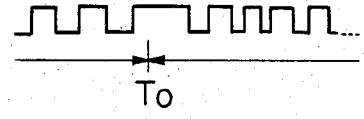
Figure 13A:
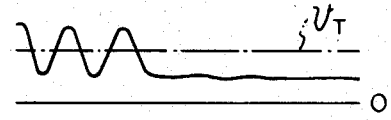
FIGS. 13(A), (B), (C) and (D) are waveform diagrams for illustrating the operation of FIG. 12.
Figure 13B:
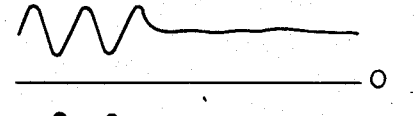
Figure 13C:
Figure 13D:
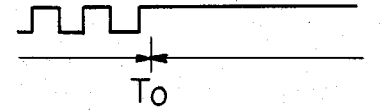

Even if a DC blocking circuit is incorporated into the circuit of FIG. 8, as indicated by numeral 35 in FIG. 10, in order to attempt to eliminate the problems described above, satisfactory operation cannot be achieved. The waveforms in this case are as shown in FIG. 11(A) to (C). The provision of DC blocking circuit 35 between LF amplifier 34 and comparator circuit 33 will prevent slowly varying changes in the amplitude of the output signal from LF amplifier 34 from being input to comparator circuit 33. However the level of reference voltage $V_t$ must in this case be set at ground potential, and any slight changes in the amplitude of the output signal from pick-up 1 while the track lock condition is maintained will result in slight variations above and below ground potential of the output signal from DC blocking circuit 35, as shown in FIG. 11(C), producing corresponding fluctuations in the output signal level from comparator circuit 33 as shown in FIG. 11(D). Since such variations in output of pick-up 1 are unavoidable in practice, the circuit arrangement of FIG. 10 cannot be used to produce a reliable tracking detection signal, for use with the present invention.

Figure 12:
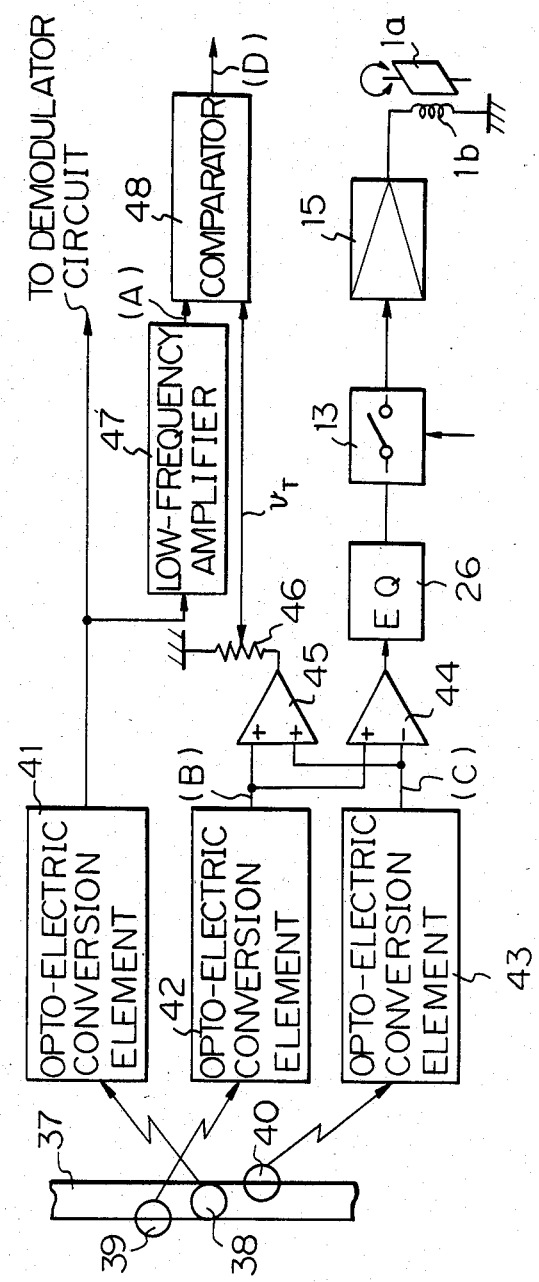
FIG. 12 is a block circuit diagram of examples of a tracking detection signal generating circuit and tracking servo loop for use in a pick-up positioning apparatus according to the present invention.

Referring now to FIG. 12, a general block circuit diagram of an embodiment of a tracking detection circuit according to the present invention for use with the embodiment of FIG. 1 is shown. Numeral 37 denotes a portion of a recording track. Pick-up 1 includes means for focussing three beams of light on the recording disc surface, to produce three light spots designated as 38, 39 and 40 respectively. Light spot 38 is used for read-out of data from the disc, i.e. constitutes the data sensing light spot, while light spots 39 and 40 are utilized for measurement of data sensing light spot position and will be referred to as the tracking light spots. The data sensing light spot 38 and tracking light spots 39, 40 are respectively arranged such that when the center of data sensing light spot 38 is positioned on the central axis of recording track 37, the centers of tracking light spots 39 and 40 are respectively positioned on opposite sides of the track, i.e. upon the opposite edges of the track. Thus when data sensing light spot 38 deviates from a position centrally aligned on recording track 37, the amount of this deviation will result in a corresponding change in the relative amounts of light reflected from tracking light spots 39 and 40, since a recording track has a different reflectance coefficient from that of the recording disc surface between the recording tracks.

Numerals 41, 42 and 43 denote photo-electric transducer elements which are respectively positioned to receive light reflected from light spots 38, 39 and 40. The resultant output signal from photo-electric transducer element 41 will be a modulated RF signal so long as the track lock condition is maintained, and this is input to demodulator circuit 6 shown in FIG. 1, and also to a LF amplifier 47 whose output signal is applied to one input of a comparator circuit 48. The output signal from photo-electric transducer element 42 is applied to one input of a summing amplifier 45 and to one input of a differential amplifier 44. The output signal from photo-electric transducer element 43 is applied to the other input of summing amplifier 45 and to the other input of differential amplifier 44. The output signal level from summing amplifier 45 thus is equal to the sum of the output signals from photo-electric transducer elements 42, 43 multiplied by the amplifier gain, while the output signal level from differential amplifier 44 is equal to the difference between the output signal levels from photo-electric transducer elements 42, 43, multiplied by the amplifier gain. It will be assumed in the following that the reflectance coefficient of the recording tracks is lower than that of the recording disc surface between the recording tracks. The output signal from differential amplifier 44 is passed through a phase equalizer circuit 26 (for tracking servo loop stabilization), so that the combination of photo-electric transducer elements 42 and 43, differential amplifier 44 and equalizer 26 constitute in combination the servo signal generating circuit 14 shown in FIG. 1.

With the position relationships described above for tracking light spots 39 and 40, the output signal from summing amplifier 45 is held constant with respect to changes in the positions of these light spots relative to recording track 37. This summing amplifier output signal is applied through a potentiometer 46, used as a variable voltage divider, to the other input of comparator circuit 48 as a reference voltage $V_t$. The level of $V_t$ will vary in accordance with changes in the amount of light reflected from both of tracking light spots 39, 40 (i.e. changes in the intensity of the light source producing these light spots). However it can readily be arranged that all of light spots 38, 39 and 40 are derived from a single light source, so that any variation in the output light intensity from that source will result in identical changes in the output signal levels from photo-electric transducer elements 41, 42 and 43, i.e. the output signal level from LF amplifier 47 and reference voltage $V_t$. It can thus be understood that once the level of $V_t$ has been set (by adjustment of potentiometer 46) to be midway between the maximum and minimum levels of the output signal from LF amplifier 47, then the reference voltage level will thereafter provide accurate operation of comparator circuit 48 irrespective of changes in the intensity of light output from the light source of pick-up 1, i.e. the output signal from comparator circuit 48 will remain at the high level thereof so long as data sensing light spot 38 remains positioned on the central axis of track 37, irrespective of momentary fluctuations of the output signal level from pick-up 1 resulting from dust particles, pitting etc on the track and irrespective of long-term changes in the light intensity of the light source in pick-up 1.

The waveforms of output signals from LF amplifier 47, photo-electric transducer element 42, photo-electric transducer element 43 and comparator circuit 48 (assuming as in the previous examples that the data sensing light spot traverses successive recording tracks prior to a time point $T_0$ and that thereafter track lock is achieved) are shown in FIGS. 13(A), 13(B), 13(C) and 13(D) respectively. The combinations of photo-electric transducer elements 37, 38 and 39, summing amplifier 45, potentiometer 46, LF amplifier 47 and comparator circuit 48 constitute tracking detection circuit means corresponding to tracking detection circuit 12 in the embodiment of FIG. 1.

The operation of the tracking detection circuit means described above can be analyzed as follows. It will be assumed that the output signals from photo-electric transducer elements 42, 43 and 41 are respectively proportional to the amount of light which is received by each element, and that the intensities of the light beams produced by the light source in pickup 1 to produce light spots 38, 39 and 40 are such that amounts of reflected light from tracking light spots 39 and 40 are equal (for the condition in which these are symmetrically disposed as shown in FIG. 12) and the amount of light reflected from data sensing light spot 38 is greater than that from each of tracking light spots 39 and 40. The intensity of light reflected from each of tracking light spots 39 and 40 will be designated as Pt (W), that of the data sensing light spot as Pf (W), the reflectance coefficient of the disc surface between the recording tracks as R, and the reflectance coefficient of the recording track surface as r, (where $r < R < 1$). The conversion factor of the data sensing system (i.e. between photo-electric transducer element 41 and the output of LF amplifier 47) will be designated as Kf (V/W) and that of the tracking system (from input to photo-electric transducer elements 42, 43 to the output of amplifier 45) as Kt (V/W), taking into consideration the losses and sensitivity of the reflected light photo-electric transducer elements 42, 43 and 41 and electrical gain (i.e. in amplifier 47 and differential amplifier 44, summing amplifier 45). The maximum values of each of tracking sensor output signals (B) and (C) shown in FIG. 12 will then be given as Pt.R.Kt (V), while the minimum value will be Pt.r.Kt. (V). The maximum value of the data sensing output signal (A) will be Pf.R.Kf (V), while the minimum value will be Pf.r.Kf (V). If reference voltage $V_t$ is set to a level which is midway between the maximum and minimum values of signal (A), then:

$$V_t = Pf.Kf.(R+r)/2 \quad (1)$$

The sum of the pair of tracking signals (B) and (C) is fixed at a level $V_s$ which is expressed as follows:

$$V_s = Pt.Kt.(R+r) \quad (2)$$

In equations 1 and 2, the factor (R+r) is a variable whose value depends upon the reflectance coefficient of the disc surface, pitting of the surface, etc., while Pt, Pt, Kf and Kt are determined solely by the system and are independent of the disc.

A constant $\alpha$ can be determined such that $V_s = V_t$, i.e.

$$\alpha.Pt.Kt.(R+r) = Pf.Kf.(R+r)/2$$

Here, $\alpha$ represents the amount of voltage stepdown produced by potentiometer 46, whereby the output level from summing amplifier 45 is divided to provide the appropriate value of $V_t$ for input to comparator circuit 48.

From the above description of the preferred embodiments, it can be understood that a position setting system according to the present invention enables a data sensing light spot to be rapidly and accurately moved close to a recording track on which a specified address is recorded, and that such a system can be implemented in a simple and practical manner. It should be noted that although the embodiments have been described for use with video recording discs, the invention has general applicability to a recording apparatus employing a moving recording medium on which a plurality of mutually parallel recording tracks formed thereon, with each track or group of tracks having address data recorded thereon, and in particular to such a recording apparatus in which each recorded address periodically and repetitively moves past a fixed point (such as is the case with a video recording disc).

Thus, although the present invention has been described in the above with reference to specific embodiments, various changes and modifications to the embodiments may be envisaged, which fall within the scope claimed for the invention as set out in the appended claims. The above specification should therefore be interpreted in a descriptive and not in a limiting sense.

What is claimed is:

1. In a recorded data playback apparatus including pick-up means for reading out data recorded on a plurality of successively adjacent recording tracks on a recording medium, said data being read out from a data sensing point defined on a surface of said recording medium by said pick-up means, a plurality of said recording tracks having address data recorded on a respective segments thereof, and further including means for establishing relative movement between said recording medium and said data sensing point along the direction of said recording tracks, a pick-up positioning apparatus, comprising:

scanning means operable to move said pick-up means along a fixed path such that said data sensing point successively intersects said recording tracks in a direction substantially at right angles thereto;

pick-up position data generating means for successively producing position data representing the position of said pick-up means along said fixed path;

memory circuit means;

control circuit means, operable for controlling movement of said pick-up means along said fixed path by said scanning means and for storing in said memory circuit means address data successively read out from said pick-up means from a plurality of said recording tracks while also storing in said memory circuit means daid position data from said pick-up position data generating means representing the position along said fixed path of said pick-up means at the time of readout of said address data, and operable thereafter for finding the stored address data in said memory circuit means which most closely matches specified address data and for controlling said scanning means to move said pick-up means to the position defined by the stored position data corresponding to said most closely matching address data.

2. In a data playback apparatus for reproduction of data recorded on a plurality of recording tracks of a recording disc, including means for rotating said recording disc, each of a plurality of said recording tracks having a corresponding address recorded as digital data on a segment thereof, and moreover including pick-up means comprising data sensing means for read-out of said address data and other data recorded on said recording tracks from a data sensing point which is defined on the surface of said recording disc by said pick-up means, a pick-up positioning apparatus for rapidly moving said data sensing point to the vicinity of one of said recording tracks on which a specified address is recorded, said pickup positioning apparatus comprising:

memory circuit means;

control circuit means operable to produce control signals for selectively establishing an address acquisition mode of operation in which said recording disc is rotated while address and position data are stored in said memory circuit means, a search mode of operation in which position data are read out from said memory circuit means and a normal playback mode of operation in which data recorded on said recording tracks are continuously read out by said pick-up means;

scanning means controlled during said address acquisition mode for transporting said pick-up means along a fixed path which coincides with a radius of said recording disc to thereby move said data sensing point to successively intersect said recording tracks substantially perpendicularly thereto, with a plurality of said disc addresses being successively read out by said pick-up means to be input to said control circuit means;

pick-up position sensing means for sensing successive positions along said radial path attained by said pick-up means during said address acquisition mode scanning, for successively producing position data representing said positions, to be input to said control circuit means; and input means for inputting to said control circuit means data representing a specified disc address;

said control circuit means acting during said address acquisition mode to consecutively store in respective memory addresses of said memory circuit means address data representing a plurality of disc addresses successively read out by said pick-up means during said scanning, and to store position data corresponding to the positions of said pick-up means along said radial direction at which said disc addresses were respectively read out, with a fixed relationship being established between the memory address at which each of said disc addresses is stored and the memory address of the corresponding position data, said control circuit means further acting during said search mode to successively read out said stored disc addresses from said memory circuit means for comparison with said specified disc address until the stored disc address which most closely matches said specified disc address is found, and to thereupon read out from said memory circuit means the stored position data corresponding to said most closely matching stored disc address, to be utilized as target position data, and to thereafter control said scanning means to move said pick-up means along said radial direction until the position data output from said pick-up position sensing means coincides with said target position data.

3. A pick-up positioning apparatus according to claim 2 in which said pick-up means include means for position adjustment of said data sensing point relative to said pick-up means along a direction at right angles to said recording tracks, and further comprising a tracking servo loop operable to establish a track lock condition in which said data sensing point position adjustment means control said data sensing point to move relative to said pick-up means such as to be held continuously positioned on one of said recording tracks as said recording disc rotates, and means for controlling said tracking servo loop to become operative during said address acquisition mode scanning only during track lock intervals of predetermined duration each of which commences shortly prior to said data sensing point attaining a position from which read-out of address data from one of said recording tracks is to begin.

4. A pick-up positioning apparatus according to claim 3, in which said tracking servo loop control means comprise tracking detection signal generating means for producing a tracking detection signal to indicate that said data sensing point is positioned on one of said recording tracks, gate control signal generating circuit means for producing a gate control signal during each of said tracking lock intervals, and switch means connected in said tracking servo loop, controlled by the combination of said tracking detection signal and gate control signal during said address acquisition mode such as to set said tracking servo loop in operation only while both said tracking detection signal and gate control signal are being generated.

5. A pick-up positioning apparatus according to claim 4 in which said tracking servo loop further comprises:
first and second position sensor means contained in said pick-up means, for respectively producing output signals which vary in a mutually complementary manner in accordance with a deviation of said data sensing point along a direction perpendicular to said recording tracks from a position aligned on the central axis of a recording track;
differential amplifier circuit means coupled to receive output signals from said first and second sensor means to produce an output signal varying substantially in proportion to the difference between said sensor means output signals;
phase equalization circuit means for adjusting the phase of said differential amplifier circuit means output signal; and
servo amplifier circuit means for amplifying the output signal from said phase equalization circuit means to produce a drive signal for driving said data sensing point position adjustment means such as to cancel said data sensing point position deviation.

6. A pick-up positioning apparatus according to claim 5, in which said tracking detection signal generating means comprise:
summing amplifier circuit means for producing an output signal which varies in proportion to the sum of the output signals from said first and second position sensor means;
level setting circuit means coupled to receive said summing amplifier output signal for producing a reference level signal whose level is equal to that of said summing amplifier output signal multiplied by a fixed value;
circuit means for processing said data sensing means output signal to remove a high-frequency carrier component thereof; and
comparator circuit means for comparing the levels of said reference level signal and said output signal with carrier component removed, for producing as output said tracking detection signal.

7. A pick-up positioning apparatus according to claim 5, in which said data sensing point position adjustment means further comprises
a tracking mirror movably mounted in said pick-up means for reflecting light from a light source by said tracking mirror such as to form a light spot on the surface of said recording disc, said light spot constituting said data sensing point, and drive means coupled to receive said servo drive signal for moving said mirror to thereby vary the position of said data sensing point, and in which said data sensing means of said pick-up means comprise an opto-electric transducer element for sensing light reflected from said data sensing point to thereby read out data recorded on said recording tracks.

8. A pick-up positioning apparatus according to claim 4, in which each of said recording track segments on which a disc address is recorded is immediately preceded by a track segment on which a synchronization signal is recorded, and further comprising sync separator circuit means coupled to receive data read out by said pick-up means, for producing sync pulses corresponding to said recorded synchronization signals, and in which said gate control signal generating circuit means comprise circuit means responsive to said sync pulses during said address acquisition mode operation for producing said gate control signals in synchronism therewith.

9. A pick-up positioning apparatus according to claim 8, in which said gate control signal generating circuit means comprise:
a first monostable multivibrator triggered by said sync pulses to produce output pulses of duration slightly shorter than the interval between successive read-out of said sync signals by said pick-up means during said address acquisition mode scanning; and
a second monostable multivibrator triggered on the trailing edge of each of said first monostable multivibrator output pulses to produce an output pulse whose duration is at least equal to the maximum time required for said pick-up means to read out a recorded sync signal and the succeeding address data from said recording disc during said address acquisition mode scanning, said output pulses from said second monostable multivibrator constituting said gate control signal.

10. A pick-up positioning apparatus according to claim 2, in which each memory address of said memory circuit means comprises an address portion and a data identifier portion thereof, and in which the address portion of the memory address of each stored disc address and the address portion of the memory address of the corresponding stored position data are made identical, while the data identifier portions thereof serve to identify the stored data in said memory addresses as disc address and position data respectively.

* * * * *